Patented Jan. 18, 1944

2,339,271

UNITED STATES PATENT OFFICE 2,339,271

COATING COMPOSITION AND PROCESS OF PREPARING THE SAME

Ernest B. Kester, Forest Hills, Pa., assignor to Koppers Company, Pittsburgh, Pa., a corporation of Delaware No Drawing. Application April 27, 1940, Serial No. 332,072

10 Claims. (Cl. 260—19)

This invention relates to coating compositions and processes of preparing the same. More particularly the invention relates to varnishes prepared from resinous materials obtained by reacting a phenol with a naphthalene aldehyde condensation product.

A phenol-naphthalene-aldehyde resin product may be prepared by first reacting naphthalene and formaldehyde to resinify the naphthalene and then reacting resulting resinified naphthalene with a phenol as set forth in copending application Serial No. 332,073 filed April 27, 1940. The naphthalene is preferably free from phenol and preferably in pure, solid form. The aldehyde may be used in the form of a solution (formalin— 38 to 42% aldehyde). The phenol may be benzophenol, a cresol (ortho, meta or para), a xylenol (the six isomers, alpha- or beta-naphthol or any mixture of two or more phenols.

By way of a more specific illustration, the above resin product may be prepared as follows:

About 256 parts of naphthalene are stirred into a mixture of about 150 parts of formalin and about 150 parts of sulfuric acid (66° Bé.). Heat is applied to the resulting mixture with stirring and when a temperature of about 103° C. is reached it is maintained between about 103° and about 115° for about 3.5 hours after which about 54 parts of orthocresol are introduced. The heating and stirring are continued for an additional period of about 5.5 hours, after which the resin product is separated from the heated mass, clarified by filtration and freed from acid.

The resin may be prepared by heating together about 256 parts of naphthalene, about 150 parts of sulfuric acid (66° Bé.) and about 187.5 parts of formalin for about 3.5 hours at about 105° to 113° C. Then about 61 parts of redistilled xylenols are added and reacted with the resinified naphthalene for about 2¼ hours. The resin is separated from the resulting mass, clarified and freed from acid.

The resin may also be prepared by heating together about 256 parts naphthalene, about 150 parts of formalin, and about 120 parts of sulphuric acid (66° Bé.) at about 105° to 110° C. for about 3.5 hours, after which about 94 parts of benzophenol are added and heating and stirring continued for about 14.5 hours. The resin formed is separated from the resulting mass, clarified and freed from acid.

The varnish is prepared by heating the above resin with a drying oil and then mixing a solvent with the resulting solution. The oil and resin are heated together preferably until a temperature of about 200° C. to about 300° C. is reached and thereafter the solution is cooled and the solvent added. The resulting varnish is in the form of a clear, compatible mixture. If desired ester gum and a drier may be added without affecting the clearness of the varnish.

The drying oils employed may be tung oil, linseed oil, oiticica oil, walnut oil, hempseed oil, dehydrated castor oil, or mixtures of two or more drying oils. Hydrocarbon solvents are preferably used and these may be benzine, xylene, ligroin or mixtures of two or more hydrocarbon solvents.

The following examples are set forth to illustrate the preparation of the varnish of the present invention:

Example 1.—About 70 parts of phenol-naphthalene-formaldehyde resin (prepared in a manner set forth above), about 276 parts of Chinawood oil and about 15 parts of ester gum are mixed together and heated with stirring to about 290° C. in about thirty minutes. Then about another 15 parts of ester gum and about 39 parts boiled linseed oil are added and the heating continued at about 250° C. for about eighteen minutes. The mixture is cooled, treated with about 159 parts of xylene and 114 parts of mineral spirits (benzine or ligroin) and when cold it is treated with an additional 60 parts of xylene and 16 parts of liquid drier such as "Nuodex" which comprises solutions of soaps of cobalt, manganese and lead in mineral spirits.

The resulting composition is a 40-gallon length varnish.

Example 2.—About 100 parts of phenol-naphthalene-formaldehyde resin (prepared in a manner set forth above) and about 196.7 parts of oiticica oil are heated together to about 260° C. in about 25 minutes and maintained at that temperature for about 15 minutes. The solution is cooled at least to the temperature of boiling water, after which about 103 parts of mineral spirits, about 151.5 parts of xylene and about 10 parts of liquid drier (such as Nuodex) are added to the solution.

The resulting composition is a 25-gallon length varnish.

The proportions of reagents and ingredients are given throughout in parts by weight.

The films produced, by applying the varnish of the present invention to a surface and drying the same, are smooth, transparent, glossy, flexible, tough, wear-resistant. They have strong adhesive properties, retain their elasticity and are resistant to gasolene. The varnish is particularly suited for indoor use.

What is claimed is:

1. A varnish comprising a resin formed by reacting naphthalene and formaldehyde to resinify the naphthalene and then reacting the resinified naphthalene with a phenol; drying oil and a solvent in the form of a compatible mixture.

2. A varnish comprising a resin formed by reacting naphthalene and formaldehyde to resinify the naphthalene and then reacting the resinified naphthalene with orthocresol; drying oil, and a solvent in the form of a compatible mixture.

3. A varnish comprising a resin formed by reacting naphthalene and formaldehyde to resinify the naphthalene and then reacting the resinified naphthalene with benzo-phenol; drying oil, and a solvent in the form of a compatible mixture.

4. A varnish comprising a resin formed by reacting naphthalene and formaldehyde to resinify the naphthalene and then reacting the resinified naphthalene with a xylenol; drying oil, and a solvent in the form of a compatible mixture.

5. A varnish comprising a resin formed by reacting naphthalene and formaldehyde to resinify the naphthalene and then reacting the resinified naphthalene with a phenol; drying oil, ester gum and a solvent in the form of a compatible mixture.

6. A varnish comprising a resin formed by reacting naphthalene and formaldehyde to resinify the naphthalene and then reacting the resinified naphthalene with a phenol; drying oil, ester gum, a drier and a solvent in the form of a compatible mixture.

7. A method of preparing a varnish, which method comprises heating a resin, formed by reacting naphthalene and formaldehyde to resinify the naphthalene and then reacting the resinified naphthalene with a phenol, in drying oil until a temperature of about 200° C. to about 300° C. is reached, cooling the resulting mass and mixing the latter with a solvent.

8. A method of preparing a varnish, which method comprises heating a resin, formed by reacting naphthalene and formaldehyde to resinify the naphthalene and then reacting the resinified naphthalene with a phenol, in drying oil until a temperature of about 200° C. to about 300° C. is reached, maintaining the temperature within this range for a relatively short period, cooling the resulting mass and mixing the latter with a solvent and a drier.

9. A method of preparing a varnish, which method comprises heating a resin, formed by reacting naphthalene and formaldehyde to resinify the naphthalene and then reacting the resinified naphthalene with a phenol, in drying oil until a temperature of about 200° C. to about 300° C. is reached, maintaining the temperature within this range for a relatively short period, dissolving ester gum in the resulting mass, cooling the resulting solution and mixing the latter with a solvent and a drier.

10. A varnish comprising a resin formed by reacting naphthalene and formaldehyde to resinify the naphthalene and then reacting the resinified naphthalene with a phenol; dehydrated castor oil and a solvent.

ERNEST B. KESTER.